(12) United States Patent
Avanesov et al.

(10) Patent No.: US 11,923,117 B2
(45) Date of Patent: Mar. 5, 2024

(54) MAGNETIZING PERMANENT MAGNETS

(71) Applicant: General Electric Renovables Espana, S.L., Barcelona (ES)

(72) Inventors: Mikhail Avanesov, Garching (DE); Neus Galles Raventos, Barcelona (ES); Cesar Muñiz Casais, Barcelona (ES); Julio Cesar Urresty, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 337 days.

(21) Appl. No.: 17/343,252

(22) Filed: Jun. 9, 2021

(65) Prior Publication Data
US 2021/0391106 A1    Dec. 16, 2021

(30) Foreign Application Priority Data
Jun. 10, 2020    (EP) ..................... 20382503

(51) Int. Cl.
| | | |
|---|---|---|
| *H02K 7/18* | (2006.01) | |
| *H01F 13/00* | (2006.01) | |
| *H02K 7/116* | (2006.01) | |
| *H02K 15/03* | (2006.01) | |
| *H02K 21/22* | (2006.01) | |
| *F03D 9/25* | (2016.01) | |

(52) U.S. Cl.
CPC ........... *H01F 13/003* (2013.01); *H02K 7/116* (2013.01); *H02K 7/1838* (2013.01); *H02K 15/03* (2013.01); *H02K 21/22* (2013.01); *F03D 9/25* (2016.05); *F05B 2220/706* (2013.01)

(58) Field of Classification Search
CPC ........ H02K 33/16; H02K 21/24; H02K 21/12; H02K 21/22; H02K 11/33; H02K 1/2766; H02K 1/27; H02K 1/145; H02K 1/276; H02K 1/2791; H02K 1/02; H02K 1/12; H02K 1/16
See application file for complete search history.

(56) References Cited

U.S. PATENT DOCUMENTS

| | | |
|---|---|---|
| 6,080,352 A | 6/2000 | Dunfield et al. |
| 2005/0231057 A1 | 10/2005 | Kloepzig et al. |
| 2011/0221552 A1 | 9/2011 | Rochford et al. |

FOREIGN PATENT DOCUMENTS

| | | |
|---|---|---|
| EP | 2782216 A2 | 9/2014 |
| EP | 3 413 440 | 12/2018 |
| EP | 3633698 A1 | 4/2020 |

(Continued)

OTHER PUBLICATIONS

European Search Report Corresponding to EP20382503 dated Nov. 20, 2020.

*Primary Examiner* — Bryan R Perez
(74) *Attorney, Agent, or Firm* — Dority & Manning, P.A.

(57) ABSTRACT

A method for magnetizing a section of one or more permanent magnets arranged substantially in a V-shape, comprising: applying a first magnetic field such that magnetic flux lines are substantially perpendicular to a first leg of the V-shape, and removing the first magnetic field. Then the method comprises applying a second magnetic field such that magnetic flux lines are substantially perpendicular to a second leg of the V-shape, and removing the second magnetic field. Systems and methods for magnetizing sections of permanent magnet modules are also provided.

11 Claims, 8 Drawing Sheets

(56) References Cited

FOREIGN PATENT DOCUMENTS

| | | | |
|---|---|---|---|
| JP | 2010/193587 A | 9/2010 | |
| JP | 2016/178784 A | 10/2016 | |
| JP | 2019/193404 A | 10/2019 | |
| JP | 2019193404 A * | 10/2019 | ........... H01F 13/003 |
| JP | 2020028185 A | 2/2020 | |
| KR | 20180036836 A | 4/2018 | |
| WO | WO2012/000503 A2 | 1/2012 | |

* cited by examiner

MAGNETIZING PERMANENT MAGNETS

The present disclosure relates to methods and systems for magnetizing permanent magnets. The present disclosure relates in particular to methods and system for magnetizing permanent magnet modules for an electrical machine, specifically for a generator, and more specifically for a wind turbine generator.

BACKGROUND

Electrical machines, such as motors and generators, generally comprise a rotor structure and a stator structure. In case of electrical machines employing permanent magnets, permanent magnets (PM) are generally comprised in the rotor (although they could also be arranged alternatively in the stator structure), whereas winding elements (e.g. coils) are usually included in the stator (although they could alternatively be arranged in the rotor structure).

In the case of a PM generator, rotation of the rotor structure under the influence of an external force creates a changing magnetic field in the windings, whereby electrical power may be generated. In the case of a motor, electrical power is supplied to the windings in order to set the rotor in motion. Permanent magnet generators are generally deemed to be reliable and require less maintenance than other generator typologies.

Permanent magnet generators may be used for example in wind turbines, in particular in offshore wind turbines. The prospect of less maintenance makes permanent magnet generators an attractive option specifically for offshore wind turbines.

Wind turbines generally comprise a rotor with a rotor hub and a plurality of blades. The rotor is set into rotation under the influence of the wind on the blades. The rotation of the rotor shaft either directly drives the generator rotor ("directly driven") or through the use of a gearbox. Such a direct drive wind turbine generator may have e.g. a diameter of 6-8 meters (236-315 inches), a length of e.g. 2-3 meters (79-118 inches) and may rotate at low speed, for example in the range of 2 to 20 rpm (revolutions per minute). Alternatively, permanent magnet generators may also be coupled to a gearbox which increases the rotational speed of the generator to for example between 50 to 500 rpm or even more.

Permanent magnets may be provided in permanent magnet modules, which may be attached to the rotor as a single item. A permanent magnet module may be defined as a unit having a plurality of permanent magnets, such that the plurality of magnets can be mounted to and unmounted together from a rotor of an electrical machine. Such a module may have a module base with a shape suitable for housing or carrying a plurality of permanent magnets that may be fixed to the base. The base may be configured to be fixed to a rotor rim in such a way that the plurality of magnets are fixed together to the rotor rim through the module base. The use of permanent magnet modules may thus facilitate the manufacturing of a rotor. The use of permanent magnet modules may also facilitate maintenance of the rotor: in case of a problem with a magnet, the magnet module may be disassembled and replaced by a new module.

Permanent magnet modules may have a module base formed as a stack of metal sheets which may be separated from each other by means of electrically insulating material. With this feature, magnetic losses, for example eddy currents, might be reduced in the corresponding electrical machine such that its efficiency may be improved.

Permanent magnets of direct drive offshore wind turbines are generally arranged on the permanent magnet module in a flat configuration or in V-shape configuration. However, these magnet configurations are not limited to generators in direct drive offshore applications and not even to the field of wind turbines only. Generators of considerable dimensions that may have similar configurations may also be found e.g. in steam turbines and water turbines.

In flat configurations, the permanent magnets may be mounted substantially parallel with respect to a (local) radial direction, i.e. the direction extending radially from the center of the rotor to the module, on a flat or tangential surface of the base. Magnets are generally glued to the base and may be additionally covered by a plate to improve the fixation to the base. All the magnets within a module typically have the same magnetic orientation, i.e. the North of all the magnets face towards the stator, and the magnetic orientation of the neighboring module is the opposite, as to have a radial magnetic configuration. Compared to other configurations, in flat or tangential configurations the area of the permanent magnets is generally bigger. However, permanent magnets may be occasionally detached from the base due to adhesive failure, especially in applications having a long life expectancy or working in a corrosive atmosphere as for example in wind turbines, in particular in offshore wind turbines.

In magnet modules having a V-shape configuration, the magnet modules are arranged inclined with respect to the (local) radial direction, i.e. the direction extending radially from the center of the rotor to (and through) a center of the module. In these configurations, magnets may be embedded in the base or clamped between the base and a central support fixed to the base. In these configurations, the permanent magnets may have a circumferential magnetic orientation (also sometimes referred to as "transversal" or "tangential" flux orientation). Magnetic fields and operation may be more efficient in V-shape configurations since the magnetic flux is more concentrated. However, such configurations generally require more space and may thus have a lower utilization of the module.

V-shape as used throughout the present disclosure may be regarded as any shape of magnets resembling a shape of the letter V, or of the letter V when inverted. A V-shape implies that the permanent magnets form at least two legs, which are inclined with respect to each other, i.e. they are closer to each other on one end, and further away from each other at an opposite end of the magnets. The two legs of the permanent magnets in a permanent magnet module may be closer to each other at a side close to the base of a permanent magnet module, or instead may be closer at a side close to an airgap of an electrical machine.

A permanent magnet module may include a horizontal portion in between the two inclined legs. This is still to be considered as covered by the word V-shape.

A V-shape as used throughout the present disclosure should also be understood to cover magnet arrangements covering more than a single "V". For example, permanent magnet modules including permanent magnets arranged in a W-shape, i.e. two "V"'s next to each other should also be considered to be covered.

EP 3 413 440 disclosed a permanent magnet module for an electrical machine extending along an axial direction is provided. The permanent magnet module comprises a permanent magnet assembly comprising at least one permanent magnet and a base supporting at least part of the permanent magnet assembly and extending from a bottom adapted to be positioned on a rotor of an electrical machine to a top along a radial direction. The permanent magnet assembly further comprises a first inclined permanent magnet portion and a second inclined permanent magnet portion arranged outwardly inclined along the radial direction and a tangential permanent magnet portion arranged substantially perpendicular to the radial direction.

In a configuration according to EP 3 413 440, the concentration of the magnetic flux may be enhanced and the magnetic efficiency may thus be improved in comparison to V-shape configurations and the module is more compact. Therefore, the output energy (electrical or rotational) may be increased or the size of the electrical machine may be reduced if the output energy is maintained due to that less magnet modules would be required.

Magnets used in permanent magnet modules need to be magnetized prior to use. For permanent magnet modules employing a V-shape configuration, generally pre-magnetization is used. Pre-magnetization means that the magnets are magnetized prior to assembly of the permanent magnet module. Pre-magnetization complicates the assembly process because of attracting and repelling forces between different parts. Also e.g. transport of pre-magnetized modules is more complicated, as it requires additional spacing and special packaging.

For magnet modules with magnets of substantially V-shaped cross-section, pre-magnetization is nonetheless often used, since post-magnetization (i.e. magnetization of the magnets after assembly with the rest of the module) is complicated. It generally requires a strong magnetic field, and high amounts of energy and still, magnetization may not be complete.

SUMMARY

In one aspect, a method for magnetizing a section of one or more permanent magnets arranged substantially in a V-shape is provided. The method comprises applying a first magnetic field such that magnetic flux lines are substantially perpendicular to a first leg of the V-shape, and removing the first magnetic field. The method then comprises applying a second magnetic field such that magnetic flux lines are substantially perpendicular to a second leg of the V-shape, and removing the second magnetic field.

In accordance with this aspect, a method is provided which makes it possible to post-magnetize a permanent magnet module having permanent magnets in V-shape. Instead of magnetizing the permanent magnets at the same time, the focus in a first magnetizing pulse may be on a first leg of the V-shape and in a second pulse, the focus may be on the other leg of the V-shape. It has been found that magnetizing a permanent magnet module with a V-shaped permanent magnet can be done satisfactorily and is possible in an energy efficient manner, i.e. with a relatively low amount of energy.

In a further aspect, a system is provided which comprises a fixture comprising a passage, wherein the fixture is made of a magnetic material, an upper magnetizing coil arranged in a section of the passage, a first perpendicular magnetizing coil on a first side of the passage arranged substantially perpendicularly to the upper magnetizing coil, and a second perpendicular magnetizing coil arranged substantially on a second side of the passage. The first and second perpendicular magnetizing coils are arranged such that a section of a permanent magnet module including permanent magnets having substantially a V-shape in cross-section is received in the passage, the first perpendicular coil is arranged next to a first leg of the V-shape, and the second perpendicular coil is arranged next to a second leg of the V-shape. The upper magnetizing coil is arranged such that it is arranged at an opposite side of the vertex of the V-shape.

In this aspect, a system for magnetizing a permanent magnet module is provided which enables efficient and complete magnetization of a permanent magnet module.

"Substantially perpendicular" as used throughout the present disclosure in relation with the arrangement of magnetizing coils may be understood to mean that a first coil in an axial cross-section has a first central axis around which windings are arranged, and in the same axial cross-section, the second coil has a second central axis. The first central axis of the first magnetizing coil and the second central axis have a 90°+/−30° angle between them.

In yet a further aspect, a method for magnetizing a permanent magnet module is provided. The method comprises positioning the permanent magnet module such that a section of the permanent magnet module is positioned below an upper magnetizing coil and above a first and a second bottom magnetizing coil substantially parallel to the upper magnetizing coil, and between a first perpendicular magnetizing coil and a second perpendicular magnetizing coil arranged perpendicularly to the upper magnetizing coil. Then, the upper magnetizing coil, the second bottom magnetizing coil and the first perpendicular magnetizing coil are energized to magnetize a first permanent magnet portion that is substantially diagonal between the upper magnetizing coil and the first perpendicular magnetizing coil. Then, the method comprises subsequently energizing the upper magnetizing coil, the first bottom magnetizing coil and the second perpendicular magnetizing coil to magnetize a second permanent magnet portion that is substantially diagonal between the upper magnetizing coil and the second perpendicular magnetizing coil.

"Substantially diagonal" as used herein may be understood to mean that in an axial cross-section, the central axes of the upper magnetizing coil has a first central axis, and the perpendicular magnetizing coil has a second central axis, and the first permanent magnet portion in the same axial cross-section is arranged a long a third axis, which intersects with both the first central axis and the second central axis.

Coils being "substantially parallel" to each other as used herein may be understood to mean that the central axes around which windings of different coils are arranged are substantially parallel to each other, specifically a deviation between the axes of less than 20°, and more specifically a deviation between the axes of less than 10°.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
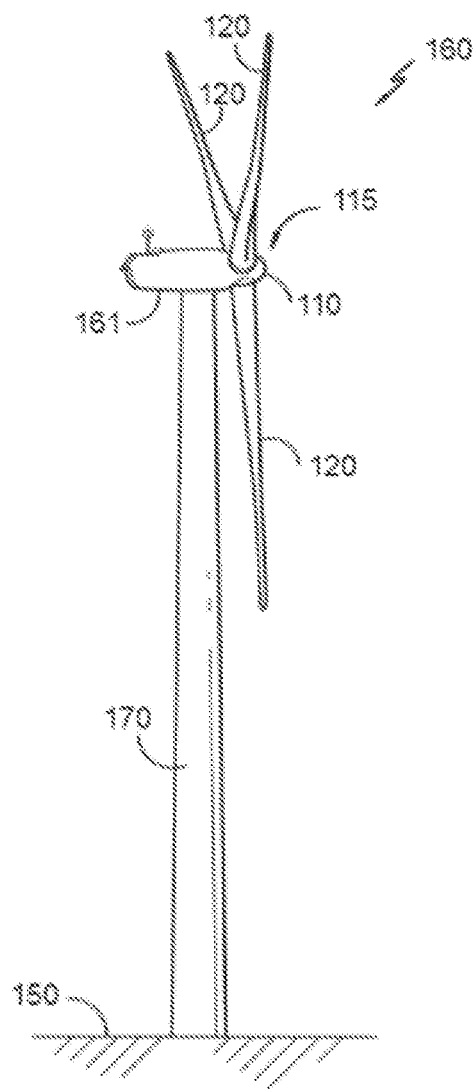
FIG. 1 illustrates a perspective view of a known wind turbine.

Reference will now be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In these figures the same reference signs have been used to designate matching elements.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
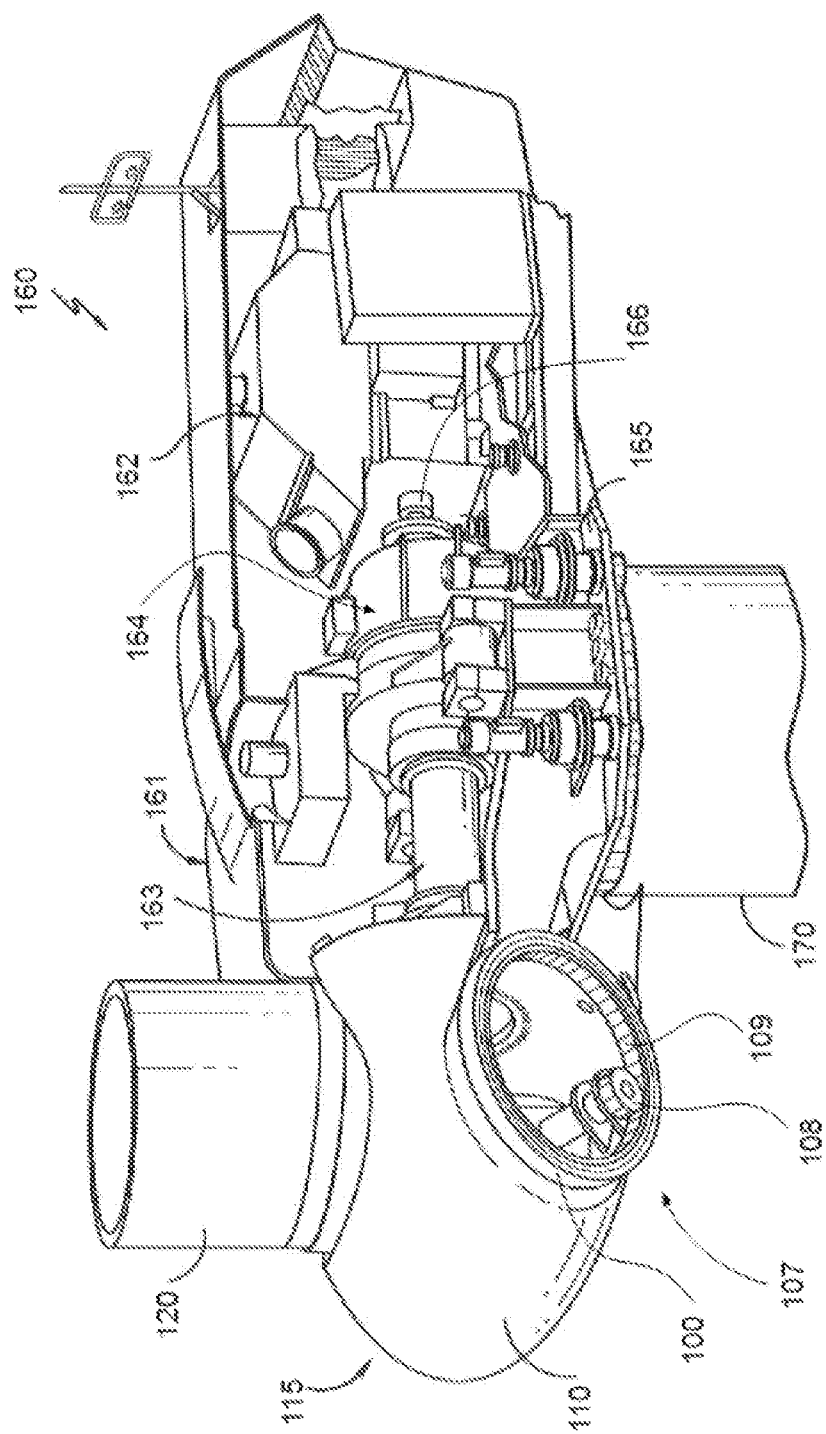
FIG. 2 illustrates a simplified, internal view of a nacelle of a wind turbine according to FIG. 1.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

Blades 120 are coupled to the hub 110 with a pitch bearing 100 in between the blade 120 and the hub 110. The pitch bearing 100 comprises an inner ring and an outer ring. A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that mesh with an annular gear 109 provided on the inner bearing ring to set the wind turbine blade into rotation.

Figure 3A:
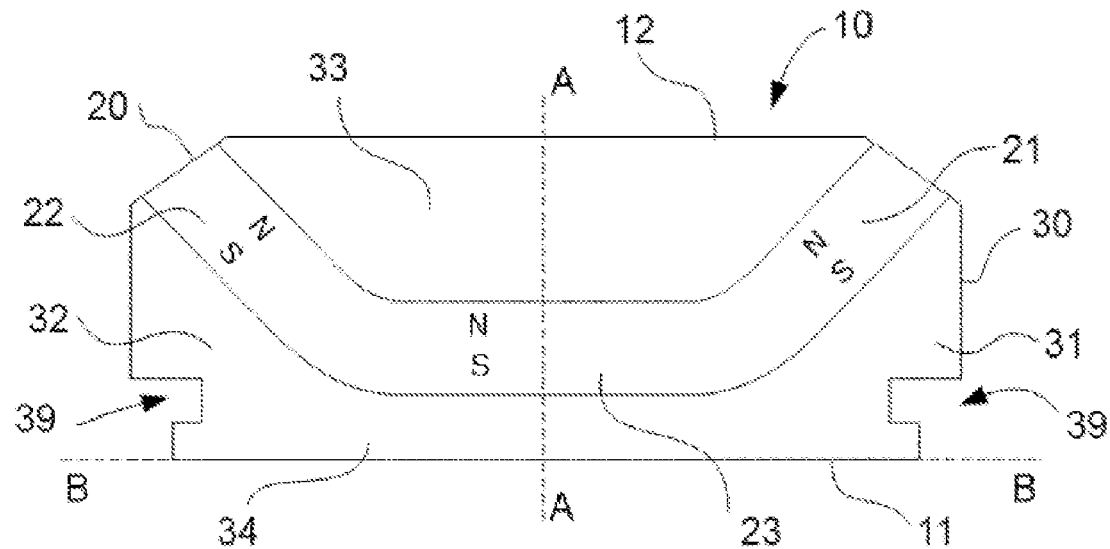
FIGS. 3A and 3B schematically illustrate two examples of permanent magnet modules.
Figure 3B:
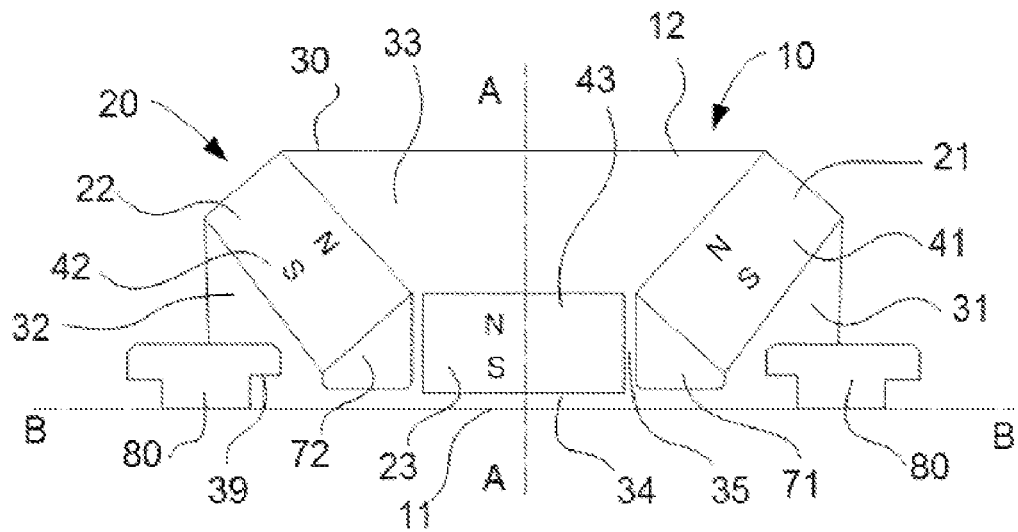

FIGS. 3A and 3B schematically illustrate two examples of permanent magnet modules FIG. 3A schematically shows an axial cross-section of an example of a permanent magnet module. FIG. 3A shows a permanent magnet module 10 for an electrical machine extending along an axial direction. The module 10 comprises a permanent magnet assembly 20 comprising at least one permanent magnet and a base 30 supporting at least part of the permanent magnet assembly 20. The base 30 extends from a bottom 11 adapted to be positioned on a rotor of an electrical machine (not shown) to a top 12 along a radial direction (along line A-A in this example). The permanent magnet assembly 20 comprises a first inclined permanent magnet portion 21 and a second inclined permanent magnet portion 22 arranged outwardly inclined along the radial direction and a tangential permanent magnet portion 23 arranged substantially parallel to a tangential direction (along the line B-B in this example), the tangential direction being substantially perpendicular to the radial direction.

Herein, an axial cross-section may be defined as the cross-section with a plane that is perpendicular to the rotational axis of the rotor and the rotational axis extends along the axial direction of the electrical machine, i.e. the plane defined by a radial direction (along line A-A in this example) and a tangential direction (along line B-B in this example).

In the example of FIG. 3A, the permanent magnet assembly 20 comprises a single permanent magnet in an axial cross-section including the tangential permanent magnet portion 23 and the first inclined permanent magnet portion 21 ("first leg" of the V-shape) and the second inclined permanent magnet portion 22 ("second leg" of the V-shape). In some examples, the permanent magnet module may comprise at least two permanent magnet assemblies consecutively arranged along the axial direction. The permanent magnet assembly 20 may thus have a substantially V shape having two inclined permanent magnet portions and a tangential permanent magnet portion. The permanent magnets may be formed by for example machining.

In some examples, the base 30 may comprise an upper pole piece 33 and a first lateral wing 31 and a second lateral wing 32. The permanent magnet assembly may be arranged between the upper pole piece 33 and the first lateral wing 31 and the second lateral wing 32.

In some examples, the upper pole piece 33 may have a substantially trapezoidal axial cross-section comprising a long side parallel to a short side and a first lateral side and a second lateral side connecting the long side to the short side. In this way, the long side is on the stator side while the short side is on the rotor side when the module is mounted on a rotor of an electrical machine. In this example, the tangential permanent magnet portion 23 is attached to the short side of the upper pole piece, the first inclined permanent magnet portion 21 is attached to the first lateral side of the upper pole piece and the second inclined permanent magnet portion 22 is attached to the second lateral side of the upper pole piece.

Inclination of the first inclined permanent magnet portion 21 and the second inclined permanent magnet portion 22 with respect to the corresponding local radial plane (along line A-A) may vary in different permanent magnet modules. The angle of inclination with respect to the radial plane may e.g. be in the range of 5°-85°, specifically in the range of 20°-70°, and more specifically between 30° and 60°. The first inclined permanent magnet portion 21 and the second inclined permanent magnet portion 22 may be arranged outwardly inclined along the radial direction, in such that the first and the second inclined permanent magnet portions form substantially a V.

In some examples, the base 30 may comprise a foot 34 connecting the first 31 and the second lateral wings 32. In this way, the structural integrity of the base may be improved. In some examples, the lateral wings and the upper pole piece may be made from different elements. In some examples, the tangential permanent magnet portion 23 may be arranged between the upper pole piece 33 and the foot 34.

The permanent magnets may be made for example from AlNiCo steel (Aluminum-Nickel-Cobalt), rare earth magnetic materials such as neodymium (NdFeB), or samarium-cobalt, but may also be made from for example ceramic materials.

FIG. 3B schematically shows another example of a permanent magnet module 10 having a substantially V-shapes magnet portion in an axial cross-section. The permanent magnet module 10 for an electrical machine of FIG. 3B extends along an axial direction. The module comprises a permanent magnet assembly 20 comprising at least one permanent magnet and a base 30 supporting at least part of the permanent magnet assembly 20. The base extends from a bottom 11 adapted to be positioned on a rotor of an electrical machine (not shown) to a top 12 along a radial direction (along line A-A). The permanent magnet assembly 20 comprises a first inclined permanent magnet portion 21 ("first leg" of the V-shape) and a second inclined permanent magnet portion 22 ("second leg" of the V-shape) arranged outwardly inclined along the radial direction (along line A-A) and a tangential permanent magnet portion 23 arranged parallel with respect to a tangential direction (along line B-B), the tangential direction being substantially perpendicular to the radial direction.

In the example of FIG. 3B, the permanent magnet assembly 20 includes the first inclined permanent magnet portion 21 comprising a first permanent magnet 41, the second inclined permanent magnet portion 22 comprising a second permanent magnet 42 and a tangential permanent magnet portion 23 comprising a third permanent magnet 43. In addition, the permanent magnet module may comprise several first permanent magnets 41 arranged along the axial direction in a row or second permanent magnets 42 arranged along the axial direction in a row or third permanent magnets 43 along the axial direction in a row. Specifically, the axial length of these magnets may be similar.

Several permanent magnet modules may be arranged axially behind one another to cover the axial length of the electrical machine.

Each or some of the first 21 and second inclined permanent magnet portions 22 and the tangential permanent magnet portion 23 may comprise several permanent magnets in the same axial plane.

In the example of the FIG. 3B, the permanent magnet module 10 further comprises a base supporting at least partially the permanent magnets and extending from a bottom 11 adapted to be positioned on a rotor of an electrical machine to a top 12 along a radial direction; wherein the first permanent magnet 41 and the second permanent magnet 42 are arranged outwardly inclined along the radial direction; and the third permanent magnet 43 is arranged substantially parallel to the tangential direction, the tangential direction being substantially perpendicular to the radial direction.

The first and second permanent magnets may be substantially rectangular in an axial cross-section. In this case, the base may comprise some protrusions placed at the end of the magnets to avoid the detachment of the magnets. Alternatively or additionally, the first permanent magnet 41 and the second permanent magnet 42 may have a substantially trapezoidal cross-section. In this way, the fixation of the magnets to the base is improved and thus the risk of an accidental detachment of such magnets may be reduced.

Additionally, the third permanent magnet 43 may have a rectangular cross-section. In other examples, the third permanent magnet 43 may have a rectangular cross-section with beveled edges.

The example of FIG. 3B shows a base 30 comprising an upper pole piece 33 and a first lateral wing 31 and a second lateral wing 32. The permanent magnet assembly may be arranged between the upper pole piece 33 and the first lateral wing 31 and the second lateral wing 32. In this example, the upper pole piece 33 has a substantially trapezoidal axial cross-section comprising a long side parallel to a short side and a first lateral side and a second lateral side connecting the long side to the short side. In this example, the third permanent magnet 43 is attached to the short side of the upper pole piece, the first permanent magnet 41 is attached to the first lateral side of the upper pole piece and the second permanent magnet portion 42 is attached to the second lateral side of the upper pole piece.

In this example, the first lateral wing 31 and the second lateral wing 32 have a substantially right triangular cross-section. In this aspect, the first permanent magnet 41 may be arranged between the inclined side of the first lateral wing 31 and one of the inclined side of the upper pole piece 33, and the second permanent magnet 42 of may be arranged between the inclined side of the second lateral wing 32 and the other one of the inclined side of the upper pole piece 33. In this way, the first permanent magnet 41 may be attached to the inclined side of the first lateral wing and to one of the inclined side of the upper pole piece 33 and the second permanent magnet 42 to the other one of the inclined side of the upper pole piece 33. Such an attachment may be for example by gluing or bonding.

As in the example of FIG. 3A, the base may further comprise lateral recesses 39 extending along the axial direction. Shaped anchors 80 may engage the shape of such lateral recesses 39 and then may be used for the fixing the permanent magnet module to the rotor rim. The anchors may be for example T-shaped anchors and may firstly be loosely attached at the circumference of a rotor rim. Then, the permanent magnet module 10 may be inserted and slid between two neighboring anchors 80. Then, to fix the magnet modules 10 in place, the bolts of the anchors (not shown) may be tightened, so that the anchors press a portion of the base against the circumference of a rotor rim. In some embodiments, the anchors 80 may span the length of the electrical machine. In other embodiments, the anchors may be divided in various segments. Alternatively, permanent magnet modules may be also attached to the rotor by other suitable methods such as welding or bolting.

In some examples, the base may include a cooling channel for cooling the magnets in order to avoid overheating of the magnets that reduces the efficiency of the electrical machine. These channels may allow air circulating in the axial direction to cool the magnets. This air flow circulating along the cooling channels may be active, i.e. air is forced to flow along the cooling channels by for example a fan, or passive, i.e. the air flow is left to flow along the cooling channels without using energy. In addition, the cooling channels may reduce the magnetic bridges formed in the permanent magnet, i.e. magnetic flux circulating from a permanent magnet to the same permanent magnet. The cooling channels may magnetically saturate these bridges and these magnetic fluxes circulating from a permanent magnet to the same permanent magnets may thus be reduced and then the loss of magnetic flux may also be reduced.

In the example of the FIG. 3B, the base 30 includes a first cooling channel 71 arranged between the first permanent magnet 41 and the third permanent magnet 43 and a second cooling channel 72 arranged between the second permanent magnet 42 and the third permanent magnet 43.

Only two examples of structures or permanent magnet modules including V-shaped permanent magnet configurations have been illustrated herein. It should be clear that other examples may not include a horizontal magnet near a vertex of the V-shape. In yet further examples, permanent magnet modules may have permanent magnets which have a configuration substantially corresponding to an inverted letter V, with or without a horizontal portion near a vertex of the V.

Figure 4:
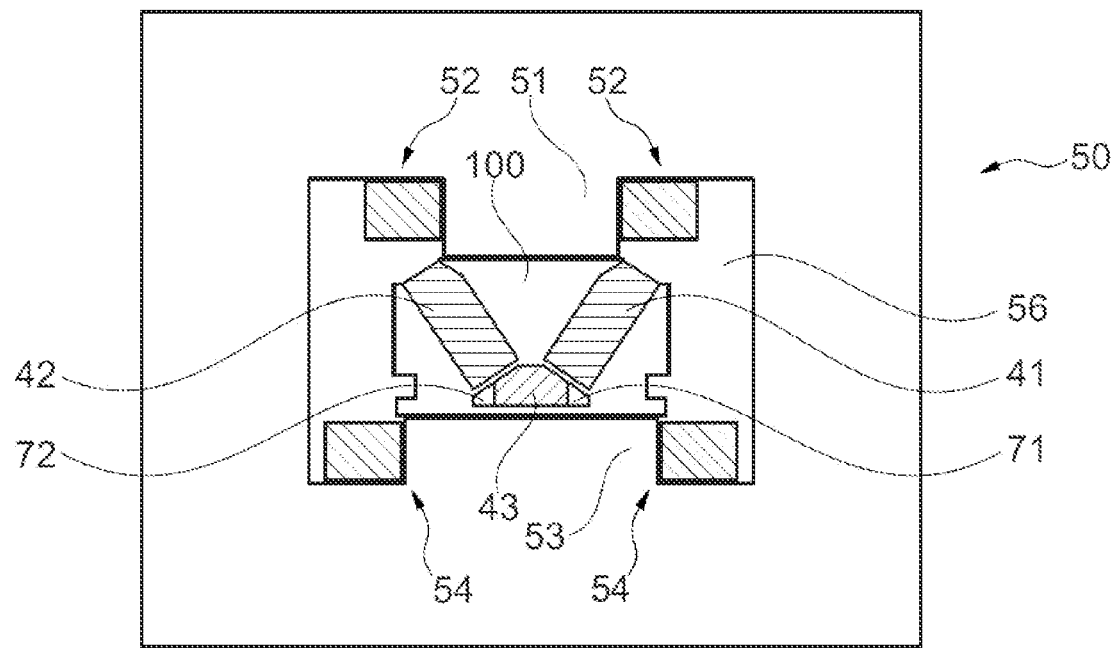
FIG. 4 schematically illustrates a method for magnetizing a permanent magnet module with a single magnetization pulse.

FIG. 4 schematically illustrates a system for magnetizing a permanent magnet module comprising permanent magnets in a substantially V-shaped axial cross-section. A fixture 50 made of magnetic material is provided. A magnetic material as used herein may be understood to be any ferromagnetic material. One suitable material for the fixture is steel. A permanent magnet module can be provided in a passage 56, such that a section of the permanent magnet module is arranged inside the fixture.

Similarly as in FIG. 3B, the permanent magnet module 100 in this example has a first inclined magnet portion 41 and a second inclined magnet portion 42 and a horizontal magnet portion 43. The first inclined magnet portion 41 and the second inclined magnet portion 42 form a first leg and a second leg of a V-shape respectively.

As has been explained with reference to FIGS. 3A and 3B, the magnet portions 41 and 42 may include an axial row of magnets within a permanent magnet module.

A first coil 52 is provided above the section of the permanent magnet module 100, and a second coil 54 is provided The first coil 52 is arranged around a portion of the fixture 51 which serves as a core for the coil 51. Similarly coil 54 is arranged around core 53.

Figure 5A:
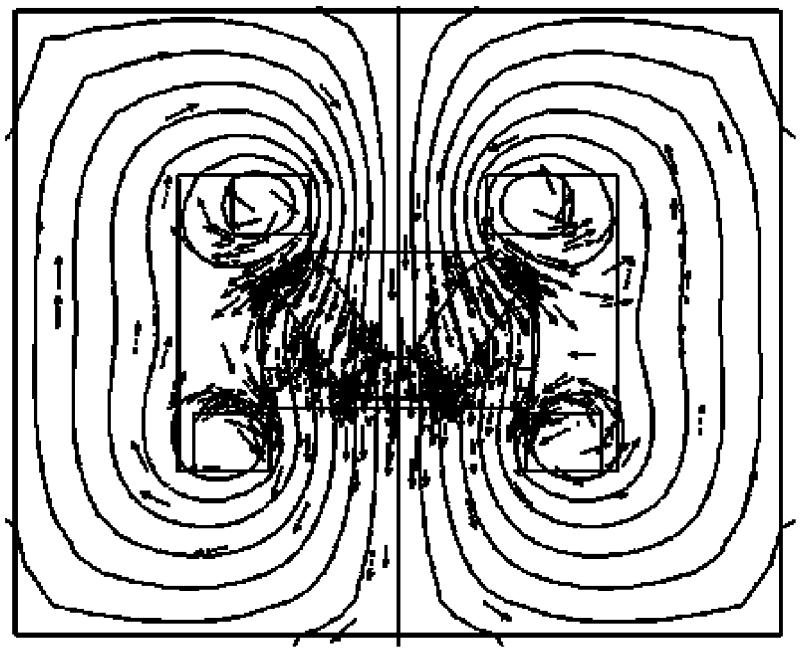
FIG. 5A schematically illustrate magnetic flux lines in a method for magnetizing in accordance with FIG. 4
Figure 5B:
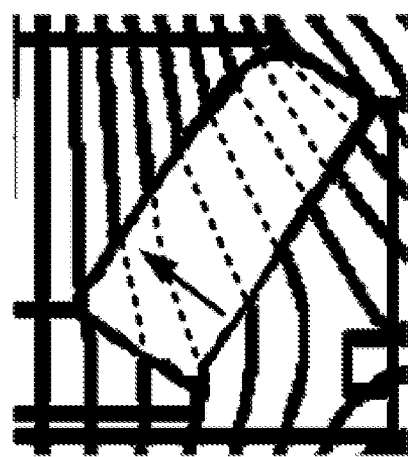
FIG. 5B shows an enlarged view of a detail of FIG. 5A.

In order to magnetize the magnets 41, 42, 43, the coils 52 and 54 may be energized. When current flows through the coils 52, 54 a magnetic field may be created inside the coils. FIG. 5A schematically illustrates magnetic flux lines during a magnetization pulse, i.e. a short period of time during which current is sent through the coils. The bottom horizontal magnet portion 43 may be magnetized to a sufficient extent in this example. But the legs of the V-shape may not be magnetized sufficiently. It may be seen in more detail in FIG. 5B that the magnetic flux lines are not perpendicular to these magnet portions. As a result, the applied magnetic field does not really coincide with the magnetization direction. In the example shown, particularly in the bottom corners of the magnet portion, there is a significant deviation between the desired magnetization direction (i.e. the magnetic orientation desired for the magnet portion) and the magnetic field that is applied. Full magnetization may not be achieved. Additionally or alternatively, magnetization of these magnet portions will require high amounts of energy.

And even when using a relatively large amount of energy, full satisfactory magnetization of the "legs", i.e. the inclined magnet portions 41 and 42 may not be achieved. This is one of the reasons why pre-magnetization has been used in the prior art for this sort of permanent magnet modules.

It is noted that the magnetization is incomplete, and therefore the necessity for an alternative arises specifically because different magnet portions require different magnetization directions.

Figure 6A:
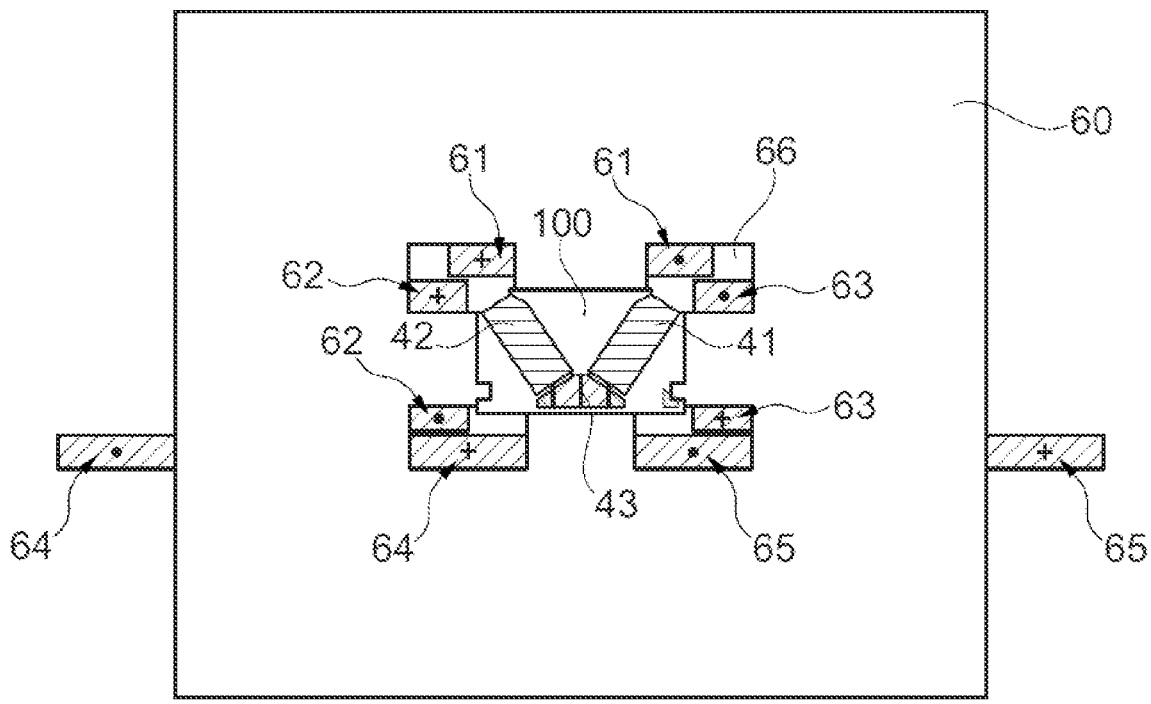
FIGS. 6A and 6B schematically illustrates examples of a method and system for magnetizing a permanent magnet module.
Figure 6B:
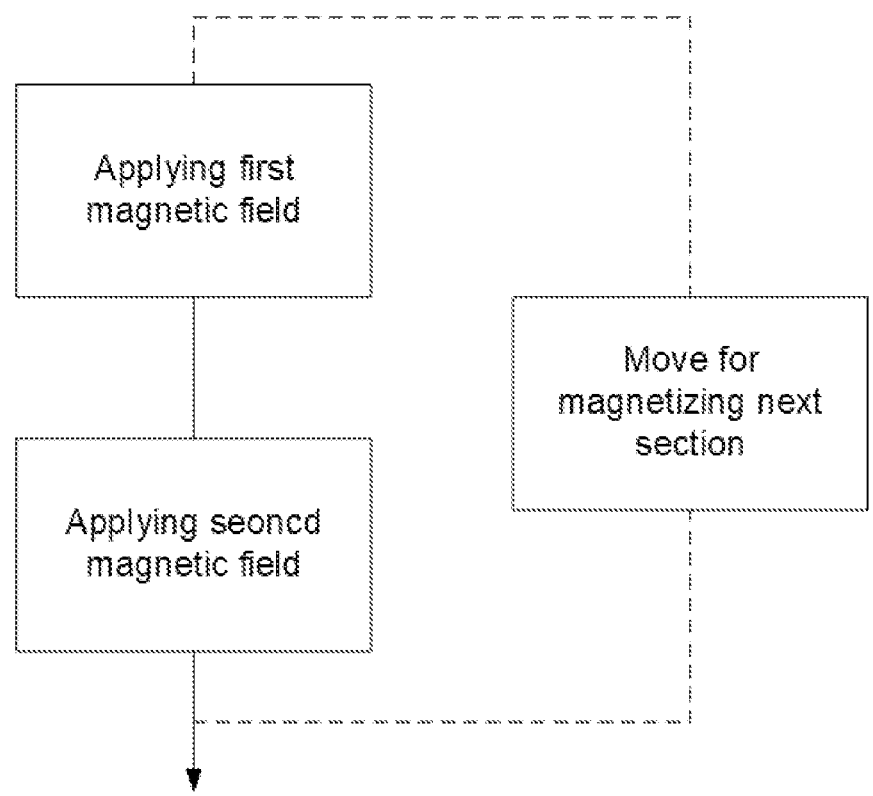

FIG. 6A schematically illustrates an example of a system for magnetizing a permanent magnet module and FIG. 6B schematically illustrates an example of a method.

FIG. 6A schematically discloses a system comprising a fixture 60 comprising a passage 56, wherein the fixture is made of a magnetic material. An open end magnetizing coil 61 is arranged in the passage, a first perpendicular magnetizing coil 63 is arranged on a first side of the passage arranged substantially perpendicularly to the upper magnetizing coil. And a second perpendicular magnetizing coil 62 is arranged substantially on a second side of the passage.

In this way, when a section of a permanent magnet module 100 including permanent magnets having substantially a V-shape 41, 42, 43 in cross-section is received in the passage 66, the first perpendicular magnetizing coil 63 is arranged next to a first leg 41 of the V-shape, and the second perpendicular magnetizing coil 62 is arranged next to a second leg 42 of the V-shape. The open end magnetizing coil 61 is arranged near an open end of the V-shape.

The permanent magnets in the module 100 may have the same magnetization as the examples shown in FIG. 3, i.e. both the first and the second legs of the V-shape have a North on an inner side of the magnet, and a South on an outer side of the magnet. In use, this arrangement forces the magnetic flux towards the stator. The "next" permanent magnet module in an electrical machine may have the Souths on an inner side of the legs, and the Norths an outer side of the legs.

In the example of FIG. 6A, the system further comprises a first vertex coil 64 substantially parallel to the open end coil 61 and a second vertex coil 65 substantially parallel to the open end coil 61, wherein the first and second vertex coils 64, 65 are arranged partially inside the passage 66.

In the example of FIG. 6A, the magnets of the permanent magnet module show a (non-inverted) V, so that the open end magnetizing coil is an upper coil arranged in a top section of the passage, and the vertex magnetizing coils may be regarded as first and second lower coils. In the case of a permanent magnet module having permanent magnets in an inverted V, the open end magnetizing coil may actually be arranged below the permanent magnet module, and the vertex coils my be arranged above the permanent magnet module.

In the example of FIG. 6A, it may be seen how the first and second vertex coils 64, 65 are arranged partially outside the fixture. The vertex coils 64, 65 are arranged offset in a transverse direction with respect to the permanent magnet module.

The system may further comprise a source for energizing the magnetizing coils 61, 62, 63, 64 and 65 and a switch circuit for energizing a selection of the magnetizing coils. The magnetizing coils may be integrated in the same circuit. By suitable switching a selection of the magnetizing coils may be activated. This can be useful in a step-wise magnetization of the assembled permanent magnet module, i.e. post magnetization, as will be explained herein.

The system may further comprise a transport system for moving the permanent magnet module through the passage. After magnetizing one section of the permanent magnet module, the permanent magnet module may be axially displaced with respect to the fixture. A subsequent section of the module can then be magnetized. In each magnetization step, a length of e.g. 5-30 cm, specifically 10-20 cm length of the module may be magnetized. A length of a permanent magnet module may be e.g. 50 cm to 2 meters, specifically about 1 meter.

In accordance with an example, and as schematically illustrated in FIG. 6B, a method for magnetizing a section of one or more permanent magnets 41, 42 arranged substantially in a V-shape, comprises applying a first magnetic field such that magnetic flux lines are substantially perpendicular to a first leg 41 of the V-shape, removing the first magnetic field, and then applying a second magnetic field such that magnetic flux lines are substantially perpendicular to a second leg 42 of the V-shape, and removing the second magnetic field.

In some examples, applying the first magnetic field may comprise activating an open end coil 61 arranged above the V-shape, and simultaneously activating a first perpendicular coil 63 substantially perpendicular to the upper magnetic coil. The first perpendicular coil 63 may be arranged on a first side next to the first leg. By arranging the perpendicular coil next to one of the legs of the V-shape the magnetic flux lines may be substantially perpendicular to the first leg 41 of the V-shape. A more effective magnetization of the magnetic portion 41 can thus take place.

In this example, applying the first magnetic field furthermore comprises simultaneously activating a first vertex (lower) coil 64, the first vertex coil 64 being substantially parallel to the open end coil 61, and the first vertex coil being arranged on a second (lateral) side, opposite to the first side.

Figure 7:
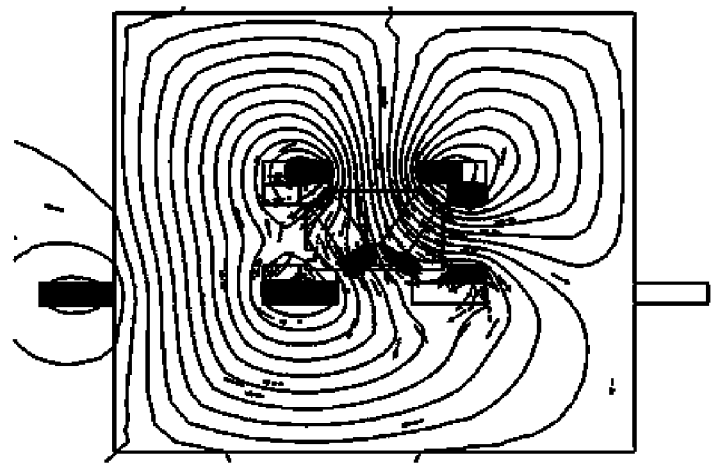
FIG. 7 schematically illustrates magnetic flux lines in a first magnetization pulse in accordance with the example of FIG. 6A.

A diameter of the first vertex coil 64 may be larger than a diameter of the open end coil 61. When the first magnetic field is applied, i.e. when magnetizing coils 61, 63, and 64 are activated, magnetic flux lines may be arranged such as shown in FIG. 7. Coils 61 and 63 cause magnetic flux lines substantially perpendicular to the first magnetic portion 41. First vertex oil 64 aides in magnetizing the substantially horizontal magnet portion 43, in between the two legs of the V-shape.

Activation of the magnetizing coils may be carried out e.g. through discharge of an electrical capacitor.

In some examples, like in the case of a permanent magnet module, a first section or portion of a device comprising permanent magnets may be magnetized first. Then, the device may be repositioned so that a next section of the device may be magnetized. This process may continue until the whole device has been magnetized, i.e. throughout its entire length.

Figure 8:
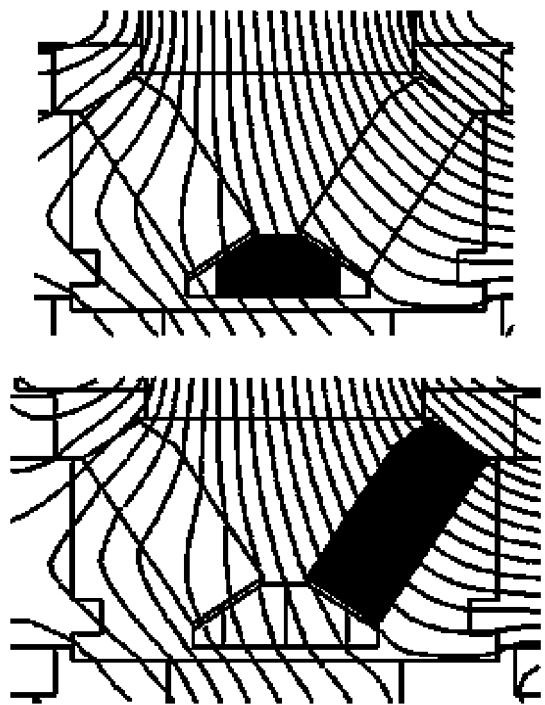
FIG. 8 schematically illustrates an enlarged view of a portion of FIG. 6A.

FIG. 8 shows in detail how the magnetic flux lines may be arranged substantially in the magnetization direction for the first leg of the V-shape. The first pulse of magnetization is far less effective for the second leg of the V-shape, since the magnetic field is not perpendicular to the second leg, i.e. the magnetic flux lines are not arranged along the desired magnetization direction.

After the first pulse, i.e. after removing the first magnetic field, a second magnetic field may be applied. Applying the second magnetic field comprises activating the upper coil 61 (i.e. the open end coil), and simultaneously activating a second perpendicular coil 62 substantially perpendicular to the upper open end magnetic coil, and wherein the second perpendicular coil 62 is arranged on a second side next to the second leg. Simultaneously, as before, the second vertex magnetizing coil 65 may also be activated.

Figure 9:
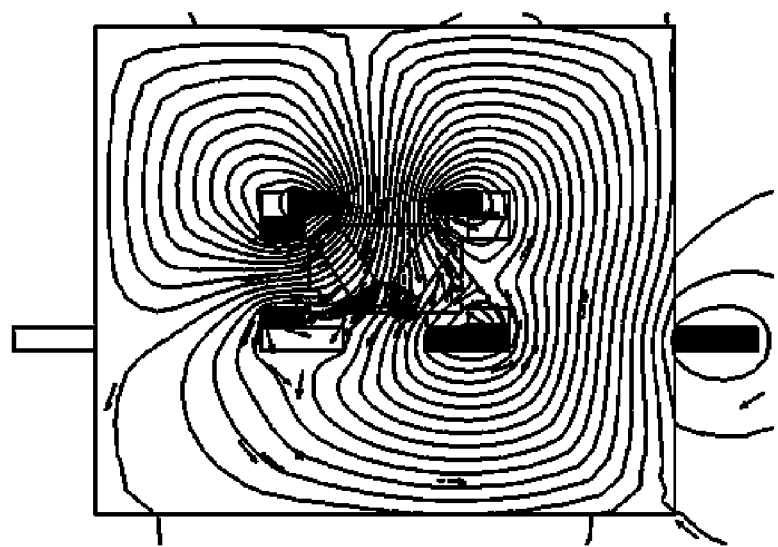
FIGS. 9 and 10 schematically illustrate magnetic flux lines in a second magnetization pulse in accordance with the example of FIG. 6A.
Figure 10:
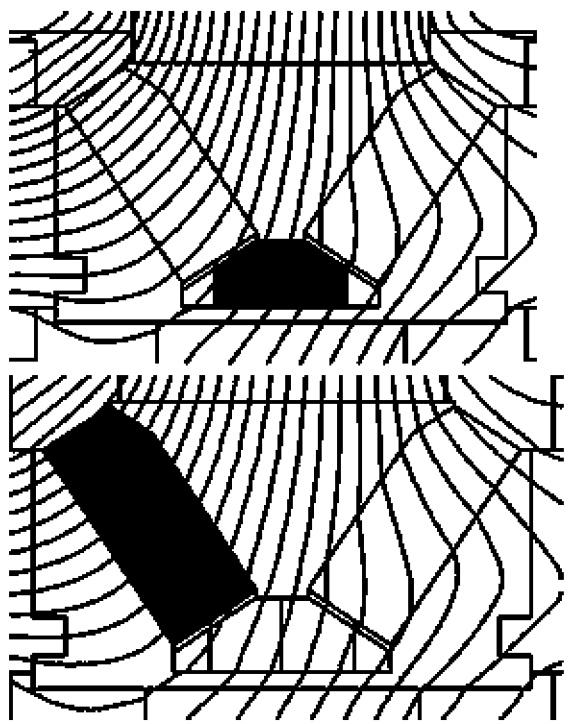

A result of the magnetic flux lines during this second magnetization pulse may be seen in FIGS. 9 and 10. During the second pulse, the magnetic flux lines may be substantially perpendicular to the second leg of the V-shape. Thus, a first pulse is aimed specifically at the first leg (in this case, the right leg) of the V-shape, and a second pulse is aimed specifically at the second leg (in this case, the left leg) of the V-shape.

A combined result of the magnetization in two separate pulses is that the permanent magnet portions 41, 42, and 43 may be effectively magnetized at relatively low energy, thus making post-magnetization possible.

The first magnetic field may be applied during a period of between 1-50 ms, specifically between 5 and 20 ms. After recharging of the capacitor, the second pulse may be applied, which may last the same amount of time as the first pulse.

In the shown examples, the permanent magnets arranged substantially in a V-shape are part of a permanent magnet module, but in other examples, a V-shape of magnets may be found in other applications.

After magnetizing a first section of the permanent magnets arranged substantially in a V-shape, a subsequent section may be magnetized. The method may further comprise axially moving the permanent magnet module prior to magnetizing the further section of the permanent magnets.

Even though in the illustrated example, leg 41 was magnetized before leg 42, it should be clear that this order may be varied. It should also be clear that in accordance with circumstance, the location of North and South on the permanent magnet portions may be varied. Specifically, when magnetizing multiple permanent magnet modules which are to be used in a rotor of an electrical machines (such es e.g. the permanent magnet modules illustrated in FIG. 3), neighboring permanent magnet modules may have opposed polarities.

In the examples of FIG. 6, the sidewalls of the permanent magnet modules may have a recess which fits around a portion of the fixture protruding into the passage. The permanent magnet modules may thus be securely moved through sliding forwards or backwards through the passage. Subsequent sections of the permanent magnet module are thus placed in a magnetizing cross-section of the fixture.

The process may then be repeated for subsequent sections. A method for magnetizing a permanent magnet module 100 is thus provided, wherein the method comprises positioning the permanent magnet module such that a section of the permanent magnet module 100 is positioned below an upper magnetizing coil 61 and above a first and a second bottom magnetizing coil 64, 65 substantially parallel to the upper magnetizing coil, and between a first perpendicular magnetizing coil 63 and a second perpendicular magnetizing coil 62 arranged perpendicularly to the upper magnetizing coil 61.

Then, the method comprises energizing the upper magnetizing coil, the second bottom magnetizing coil and the first perpendicular magnetizing coil to magnetize a first permanent magnet portion that is substantially diagonal between the upper magnetizing coil and the first perpendicular magnetizing coil, Then subsequently, the upper magnetizing coil, the first bottom magnetizing coil and the second perpendicular magnetizing coil are magnetized to magnetize a second permanent magnet portion that is substantially diagonal between the upper magnetizing coil and the second perpendicular magnetizing coil.

In different examples, different parameters may be varied, including e.g. the relative positions of the perpendicular coils, and lower magnetizing coils; a size of the coils; a strength of the field of the various magnetizing coils (current and number of windings of coils). These parameters may be varied as a function e.g. of the angle of inclination of the legs of the V-shape; presence or absence of a central horizontal magnet portion; and dimensions of the permanent magnet module.

In the example illustrated herein so far, the number of windings of the coils are different. The upper coil may have approximately double the number of windings of the other coils.

In some examples, the method may further comprise repositioning the permanent magnet module such that another section of the permanent magnet module is positioned below the upper magnetizing coil. As shown herein, the upper magnetizing coil and the first and second perpendicular magnetizing coils may be arranged in a channel in a magnetic fixture.

A magnetized permanent magnet module may be used in an electrical machine, and particularly a generator. More particularly, such permanent magnet modules may be used in a generator of a wind turbine.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for magnetizing a section of one or more permanent magnets arranged substantially in a V-shape, comprising:
    applying a first magnetic field such that magnetic flux lines are substantially perpendicular to a first leg of the V-shape;
    removing the first magnetic field;
    applying a second magnetic field such that magnetic flux lines are substantially perpendicular to a second leg of the V-shape;
    removing the second magnetic field;
    wherein applying the first magnetic field comprises:
        activating an open end coil arranged near an open end of the V-shape, and simultaneously activating a first perpendicular coil substantially perpendicular to the open end coil;
        wherein the first perpendicular coil is arranged on a first side next to the first leg; and
        simultaneously activating a first vertex coil that is substantially parallel to the open end coil, the first vertex coil arranged near a vertex of the V-shape and on a second side opposite to the first side.

2. The method according to claim 1, wherein a diameter of the first vertex coil is larger than a diameter of the open end coil.

3. The method according to claim 1, wherein applying the second magnetic field comprises activating the open end coil and simultaneously activating a second perpendicular coil that is substantially perpendicular to the open coil, the second perpendicular coil arranged on a second side next to the second leg.

4. The method according to claim 1, wherein the first magnetic field is applied during a period of between 1-50 ms.

5. The method according to claim 1, wherein the permanent magnets arranged substantially in a V-shape are part of a permanent magnet module.

6. The method according to claim 5, further comprising magnetizing a further section of the permanent magnets arranged substantially in a V-shape.

7. The method according to claim 6, further comprising axially moving the permanent magnet module prior to magnetizing the further section of the permanent magnets.

8. A system comprising:
    a fixture comprising a passage, wherein the fixture is made of a magnetic material;
    an open end magnetizing coil arranged in the passage,
    a first perpendicular magnetizing coil arranged on a first side of the passage arranged substantially perpendicular to the open end magnetizing coil;
    a second perpendicular magnetizing coil arranged on a second side of the passage;
    wherein when a section of a permanent magnet module having permanent magnets with a substantially V-shape cross-section is received in the passage, the first perpendicular coil is arranged next to a first leg of the V-shape, and the second perpendicular coil is arranged next to a second leg of the V-shape;
    the open end magnetizing coil arranged such that when a section of the permanent magnet module is received in the passage, the open end magnetizing coil is at an opposite side of a vertex of the V-shape; and
    a first vertex coil substantially parallel to the open end magnetizing coil and a second vertex coil substantially parallel to the open end magnetizing coil, wherein the first and second vertex coils are arranged partially inside the passage.

9. The system of claim 8, wherein the first and second vertex coils are arranged partially outside the fixture.

10. The system of claim 8, further comprising a source for energizing the magnetizing coils and a switch circuit for energizing a selection of the magnetizing coils.

11. The system of claim 8, further comprising a transport system for moving the permanent magnet module through the passage.

* * * * *